US008909222B2

(12) United States Patent
Pudney

(10) Patent No.: US 8,909,222 B2
(45) Date of Patent: Dec. 9, 2014

(54) TELECOMMUNICATIONS NETWORK

(75) Inventor: Christopher Pudney, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 455 days.

(21) Appl. No.: 12/680,957

(22) PCT Filed: Oct. 2, 2008

(86) PCT No.: PCT/EP2008/063260
§ 371 (c)(1),
(2), (4) Date: Jun. 24, 2010

(87) PCT Pub. No.: WO2009/043919
PCT Pub. Date: Apr. 9, 2009

(65) Prior Publication Data
US 2010/0285801 A1 Nov. 11, 2010

(30) Foreign Application Priority Data

Oct. 2, 2007 (GB) .................................. 0719208.1

(51) Int. Cl.
H04W 4/00 (2009.01)
H04W 60/00 (2009.01)
H04W 8/26 (2009.01)
H04W 48/12 (2009.01)

(52) U.S. Cl.
CPC ............... *H04W 60/00* (2013.01); *H04W 8/26* (2013.01); *H04W 48/12* (2013.01)
USPC .......................... 455/435.1; 455/436; 455/443

(58) Field of Classification Search
USPC ....................................................... 455/435.1
See application file for complete search history.

(56) References Cited

U.S. PATENT DOCUMENTS

| 5,590,398 | A | 12/1996 | Matthews |
| 5,898,923 | A | 4/1999 | Gaasvik et al. |
| 6,101,388 | A | 8/2000 | Keshavachar |
| 6,363,255 | B1 | 3/2002 | Kuwahar |
| 6,400,941 | B1* | 6/2002 | Nara .......................... 455/422.1 |
| 2005/0037812 | A1* | 2/2005 | Hsu et al. ...................... 455/561 |

OTHER PUBLICATIONS

International Search Report for PCT/EP2008/063260.
European Search Report for GB 0818029.1.

(Continued)

*Primary Examiner* — Justin Lee
(74) *Attorney, Agent, or Firm* — B. Aaron Schulman, Esq.; Stites & Harbison, PLLC.

(57) ABSTRACT

A method is disclosed for registering a mobile terminal with a cellular telecommunications network, the network having a plurality of location areas and a plurality of extended areas of coverage, each extended area being represented by a list of a subset of cells on one or more the location areas, and the mobile terminal using information about a given one of the location areas to connect to the network. The method comprises transmitting a signal including a temporary identifier, which is unique to the mobile terminal when combined with the location area identifier that identifies the cell in which the temporary identifier was allocated a temporary identifier; transmitting an indication of whether the mobile terminal supports location registration based on extended areas ("soft location registration"); and if soft location registration is supported, performing location registration based on the extended area between the mobile terminal and the network. The above method is compatible with existing deployments of 2G and 3 G networks in both packet switched (PS) and circuit switched (CS) domains.

21 Claims, 2 Drawing Sheets

(56) References Cited

OTHER PUBLICATIONS

NTT Docomo, Inc. "CR to TS23.221_functionality_procedure; CR to TS23.221_Architecture Requirement; CR to TS23.060_GPRS Information Storage; A way forward for registration in densely-populated area" S2-073525, [Online]—(Aug. 31, 2007) XP002512905 3GPP TSG SA WG2 Meeting #59, Helsinki, Finland Retrieved from the Internet: URL:http://www.3gppl.org/ftp/tsg_sa/WG2_Ar ch/TSGS2_59_Helsinki/Docs/S2-073525.zip; http://www.3gppl.org/ftp/tsg_sa/WG2_Arch/TSGS2_59_Helsinki/Docs/> [retrieved on Aug. 31, 2007].

* cited by examiner

TELECOMMUNICATIONS NETWORK

FIELD OF THE INVENTION

The present invention relates to a telecommunications network. In particular, the invention relates to implementation of location registration within cellular telecommunications networks.

BACKGROUND OF THE INVENTION

Bearer technologies (e.g. GSM, UMTS) available in different territories can vary significantly. Thus, unlike many other countries with UMTS bearer technologies (3G), Japan does not have associated GSM (2G) networks. This is of considerable inconvenience for users of GSM handsets who wish to "roam" in Japan.

To receive a new call, a mobile terminal will need to be in registered in a paging area with the network. There are a number of problems that arise at the boundaries of paging areas in cellular networks of a particular bearer technology. In particular, customers may experience difficulties establishing new calls due to congestion in location registration signalling (idle state signalling) at cell boundaries—this scenario can arise when large numbers of terminals cross boundaries simultaneously, as would be the case for commuters on trains or in densely populated areas where cells cover smaller areas. Clearly, the route of a train can cross and re-cross cell boundaries many times leading, on occasions, to protracted denial of new calls.

Under GSM (and UMTS) standards, location registration signalling at cell boundaries is performed by storing a current Location Area (LA), or for UMTS Routing Area (RA), value—this value is associated with a particular cell and thus a respective base station (node B). In idle state, the terminal checks at cell change whether the new cell is still associated with the stored LA/RA—if there has been a change of value the terminal is forced to carry out a location/routing area update (LAU/RAU).

Denial of new call facility in one bearer technology need not prevent the use of a second bearer technology for which there is no signalling congestion. In at least some 2G/3G networks, combined 2G/3G MSCs and/or SGSNs, potentially with combined 2G/3G LAs and potentially with combined RAs are deployed. One reason for this is to limit the idle mode signalling caused by mobiles toggling between 2G and 3G coverage areas.

To address this problem in territories lacking an alternative bearer technology, a common UMTS plus GSM arrangement solution has been suggested which is based on a concept of "eXtended Areas". In place of the storage of a single RA, the terminal is adapted to store a list of associated RAs—referred to hereinafter as XAs: and rather than comparing the detected RA to a single stored RA it is the detected XA is compared to all the members of the XA list. Only if the detected XA is not a match for any XA on the XA list will there be a routing area update.

Enhancements to the "area" concept of 3G without corresponding enhancements to 2G are liable to mean that operators face increased 3G-2G signalling load if they "enhance" their 3G area concept. This is undesirable.

It is highly desirable that there is a solution that works effectively on 2G (i.e. GSM), 3G (i.e. UMTS) and combined 2G/3G networks.

The GSMA have a work item specifically addressing such problems referred to as the "registration in densely populated areas" (RED) concept. It is further desirable that the RED concept is added to both 2G and 3G networks, and in both packet switched (PS) and circuit switched (CS) domains in a backward compatible manner.

This imposes some constraints on the solutions, and, in developing the concept, it is necessary to ensure that the solution can be retro-fitted onto the existing systems.

3G UMTS is probably more flexible in its capabilities than 2G GPRS which, in turn, is somewhat more flexible than 2G-Circuit Switched (i.e. GSM).

In each case, the XA concept cannot be introduced without altering the operation of the location registration process.

SUMMARY OF THE INVENTION

The present invention seeks to provide a location registration scheme that reduces MSC and SGSN processing load, and UE signalling traffic (and battery consumption) while conforming to the restrictions set out above.

In accordance with the present invention there is provided a method for registering a mobile terminal with a cellular telecommunications network, the network having a plurality of location areas and a plurality of extended areas of coverage, each extended area being represented by a list of a subset of cells on one or more the location areas, and the mobile terminal using information about a given one of the location areas to connect to the network; the method comprising: transmitting a signal including a temporary identifier, which is unique to the mobile terminal when combined with the location area identifier that identifies the cell in which the temporary identifier was allocated; transmitting an indication of whether the mobile terminal supports location registration based on extended areas (also referred to as "soft location registration"); and if extended area registration is supported, performing location registration based on the extended area.

Preferably, extended area identification data is broadcast over the BCCH-ext channel.

Advantageously, the last visited extended area is stored and transmitted to the network during soft location registration. Furthermore a plurality of recently visited extended areas may be stored during soft location registration.

It is preferred that an indication of the time spent in the one, or each, stored extended area is stored and transmitted to the network.

Providing a suitable solution requires that certain assumptions are made—in particular that TMSI is used in idle state signalling rather than IMSI. TMSI is the "temporary" network-assigned version of the IMSI (a number unique to each SIM card and, assuming that terminals incorporate one and only one SIM card, unique to that terminal at least for the purposes of the establishment of a new connection).

BRIEF DESCRIPTION OF THE DRAWINGS

The above-mentioned and other advantages, special features and practical refinements of the invention are also explained on the basis of the description below of exemplary embodiments and provided with reference to the figures.

DETAILED DESCRIPTION OF THE PREFERRED EMBODIMENTS

Figure 1:
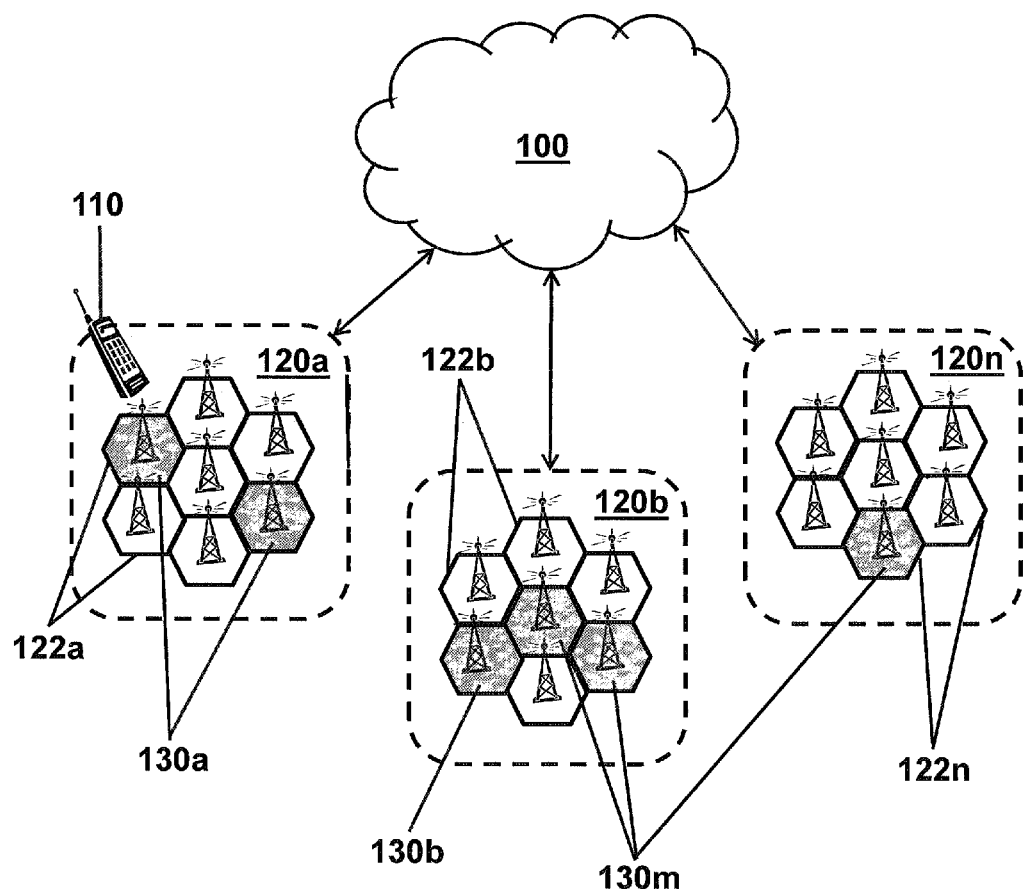
FIG. 1 is a diagram showing a schematic representation of a communication system in accordance with an exemplary embodiment of the present invention.

In general, FIG. 1 shows a schematic representation of an exemplary communication system with a cellular telecommunications network 100 that contains an infrastructure for establishing connections to mobile terminal devices, such as mobile terminal device 110 shown by way of an example in FIG. 1. Telecommunications network 100 is connected with a plurality of base stations that each comprise a radio interface for access to the communication system in an associated geographic region or cell. More specifically, telecommunications network 100 has a plurality of location areas 120*a*-120*n*, which each include a respective plurality of cells 122*b*-122*n*, and a plurality of extended areas of coverage 130*a*-130*m*. As illustrated in FIG. 1, each extended area 130 is provided as a subset of the cells 122 included on one or more of the location areas 120. In exemplary embodiments, extended area identification data is broadcast over the BCCH-ext channel.

Figure 2:
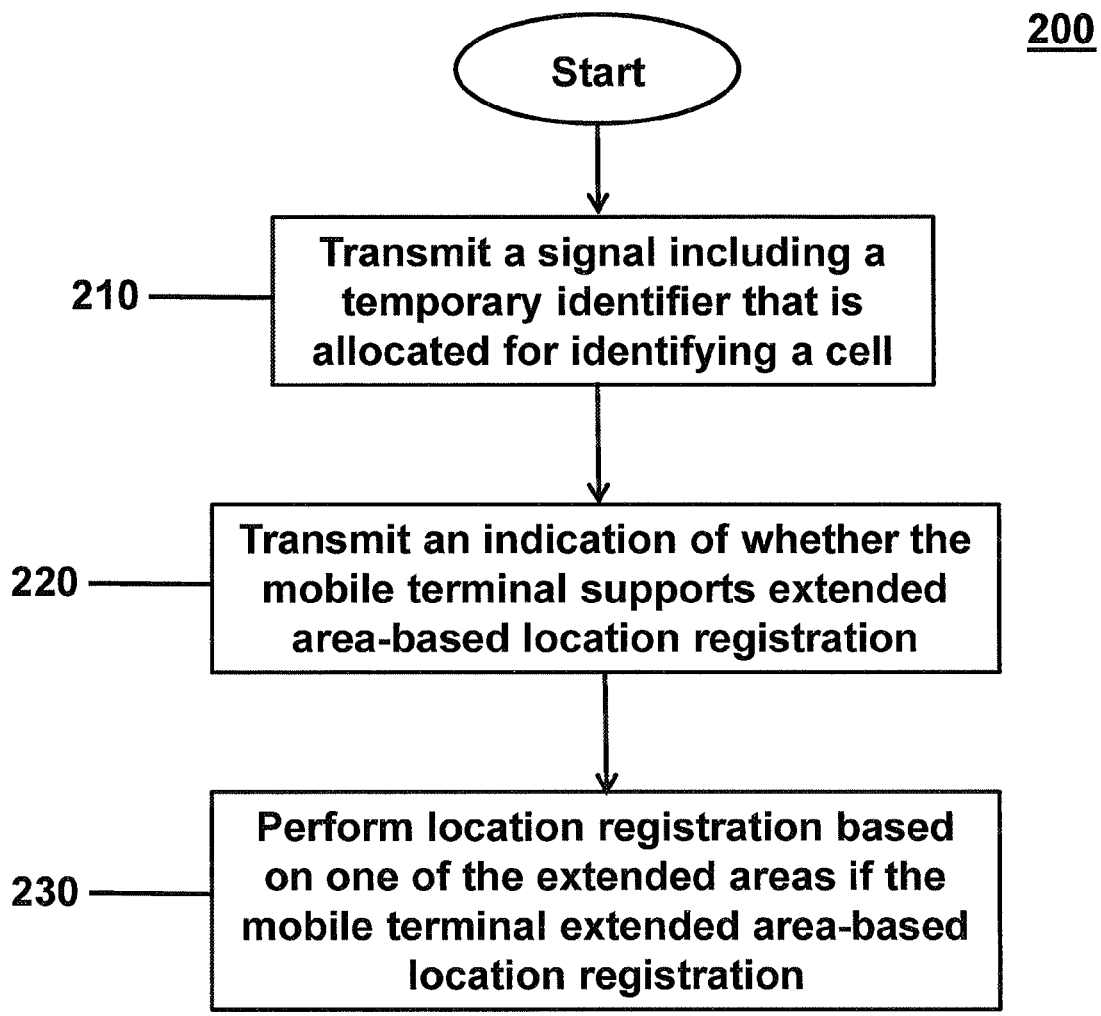
FIG. 2 is a flowchart showing an exemplary embodiment of a process for registering a mobile terminal with a cellular communication in the communication system illustrated in FIG. 1 in accordance with the present invention.

FIG. 2 is a flowchart illustrating an exemplary embodiment of a process 200 of registering the mobile terminal 110 with the cellular telecommunications network 100 in the exemplary communication system illustrated in FIG. 1. In exemplary process 200, the mobile terminal 110 uses information about a given one of the location areas 120 to connect to the network 100.

More specifically, at block 210, the mobile terminal 110 transmits a signal that includes a temporary identifier. The temporary identifier is unique to the mobile terminal 110 when combined with a location area identifier that identifies the cell 122 for which the temporary identifier was allocated. At block 220, the mobile terminal 110 transmits an indication of whether the mobile terminal 110 supports extended area-based location registration. At block 230, if the mobile terminal 110 supports extended area-based location registration, location registration based on one of the extended areas 130 is performed. In exemplary embodiments, a last visited extended area or a plurality of recently visited extended areas can be stored and transmitted to the network 100 during extended area-based location registration at block 230. In further exemplary embodiments, an indication of the time spent in each stored extended area can be stored and transmitted to the network.

In an embodiment of the invention the following features are annexed to the existing GSM standard:

1 Length of 2G-CS Location Updating Request Message

In GSM CS, the Location Updating Request message is used for both "power up attach" and "movement" and "periodic" location updates. The message is sent as the payload of a layer 2 message that also establishes the layer 2 'acknowledged mode' operation. As a consequence, the size of the message contents are limited to N201 bytes in A/Gb mode. The reader is referred to 3GPP TS 44.006 for the value for N201 (typically it is 20 bytes).

Currently, the A/Gb mode LU request message is either 18 octets long (when an IMSI is sent) or 15 octets long (when a TMSI is sent).

Owing to the rules for adding new information to the Layer 3 messages in 24.008, this gives very little room for additional information!

However, if it is ASSUMED that the network uses TMSIs, then there is room for one type-length-value (TLV) encoded information element to be added, carrying 3 octets of useful information.

2 Indication of Network/Terminal Support of New XA Concept

By use of the Classmark Information, the mobile can indicate its support to the network in its "attach" message, and in its subsequent "area update" messages.

If the mobile indicates its support to the (Core) Network, and, the mobile still supports the legacy LA/RA concepts, then there does not seem to be any need for the network to broadcast its support for the new Area concept.

In 2G-CS, the mobile could indicate its support for this new feature by using either the last spare bit in Classmark 1, or, the spare bit in the "location updating type" field. The latter may be preferable as the GSM BSC does not need to know whether the mobile supports the new XA concept.

Note: Classmark 1 is used by both the BSC and the MSC.

3 Broadcast of XA Information on GSM BCCH

With current GSM idle mode cell reselection, the mobile needs to know whether or not a candidate cell is in the same or different location/routeing area before applying an offset and then determining the best current cell. If XAs are added to GSM, then it is likely that they need to be broadcast by each cell.

Currently System Information 3 and 4 (plus SI 7 and 8) are the messages that a mobile uses when performing cell reselection.

Unfortunately the current System Information 3 and 4 messages probably do not have room to transmit an XA area ID of, say, 1 octet. However, these 'messages' can be extended by the use of System Information 16, 17, 7 and 8 messages which are sent on the BCCH-ext channel.

Use of the BCCH-ext can slightly reduce the paging capacity of a GSM cell.

4 Movement into an "Area that does not Support XAs"

When moving from an area supporting XAs to an MSC or SGSN that does not support XAs, then the mobile needs to be able to supply the target MSC/SGSN with its "globally unique temporary ID".

Currently this "Globally unique temporary ID" is:
in the CS domain—TMSI+LAI;
in the PS domain—P-TMSI+RAI The target MSC/SGSN uses the LAI/RAI to identify the source MSC/SGSN and passes the TMSI/P-TMSI to that node in order to retrieve context information about the mobile.

The addition of an XA concept does not seem to require any change to these definitions of "globally unique temporary IDs", nor any change to the signalling between 'old' and 'new' MSCs/SGSNs at LA/RA update.

5 Allocation of XAs to the Mobile

This can be done by the MSC adding the set of XAs to the existing Location Updating Accept message, because, in GSM, this message has room for expansion (up to a 251 octet limit).

The mobile would still be allocated a TMSI and LAI for use in (unmodified) subsequent 3GPP TS 24.008 procedures, e.g. CM Service Request; Call Reestablishment; IMSI Detach.

6 How to Assign an Accurate XA List to the Mobile?

In line with recent discussions on LTE in SA2, it seems beneficial to supply the network with at least the "last visited XA" when the mobile performs a Location Update.

With the assumption on the use of a TMSI rather than an IMSI above, this seems possible (further assuming that the XA-ID is about 1 octet long) when the mobile is using a TMSI. So, provided TMSIs are in use, this should not be a problem (note that the use of A-flex requires the use of TMSIs).

In fact, within the 3 octets that are available, there is probably room to signal the last two visited XAs (or 3 XAs if the XA ID was only 6 bits) along with some approximate indication of the time spent in each XA (e.g. less than 2 minutes; between 2 and 10 minutes; between 10 and 60 minutes; more than one hour).

7 Storage of XA When the Mobile is Powered Down?

When a mobile is switched on, in the circuit switched domain, the mobile reads the TMSI and old-LAI from the (U)SIM. If there is no TMSI available, the mobile accesses with its IMSI.

While it is possible to store the current XA as the last visited XA when the mobile is powered down, it is not considered worthwhile. This is because:

- if the mobile has not moved, then the current XA will be the same as the "last visited" XA; and
- if the mobile has moved, then the core network will need geographic knowledge to determine if the last visited XA is adjacent to the current XA. Ideally, the core network would not have too much geographic knowledge.

8 Treatment of 'Normal' Location Updates by the MSC

Currently, at "power on" in a new LA and in the CS domain, the mobile performs a 'normal location update' and not an "Attach". Thus the MSC is unable to determine the difference between a "powered up movement across an LA boundary" and a "power down in LA=1, move a large physical distance, power up in LA=27" without a detailed knowledge of the LA boundaries. This inability to determine the mobile's movement history is liable to present difficulties to the "XA list allocation" algorithm in the MSC.

To further improve system performance when using the XA concept, it is advantageous to change the Location Update rules so that a mobile always indicates "LU Type=Attach" to the MSC at power on.

With this change, then, when the MSC receives a Location Updating Request (with LU type set to 'normal') from an XA capable mobile, the MSC would know that the 'last visited XA(s)" was/were adjacent to the area served by the current cell. (It is assumed that the BSS continues to attach the current cell ID to the message sent to the MSC). Conversely, for a Location Updating Request with LU type set to 'attach', the MSC can implement a different strategy.

It is appreciated that an alternative mechanism for extracting the "movement information" would be for the GSM MSC (or SGSN) to send an enquiry message to the mobile, and, for the mobile to respond with a standalone GMM message that contains a list of 'visited XAs' and timestamps.

There now follow a series of illustrative encodings of the Location Updating request message.

This message is sent by the mobile station to the network either to request update of its location file (normal updating or periodic updating) or to request IMSI attach. See Table 1 overleaf (adapted from Table 9.2.17/3GPP TS 24.008).

TABLE 1

Message type: LOCATION UPDATING REQUEST
Significance: dual
Direction: mobile station to network

| IEI | Information element | Type/Reference | Presence | Format | Length |
|---|---|---|---|---|---|
| | Mobility management protocol discriminator | Protocol discriminator 10.2 | M | V | 1/2 |
| | Skip Indicator | Skip Indicator 10.3.1 | M | V | 1/2 |
| | Location Updating Request message type | Message type 10.4 | M | V | 1 |
| | Location updating type | Location updating type 10.5.3.5 | M | V | 1/2 |
| | Ciphering key sequence number | Ciphering key sequence number 10.5.1.2 | M | V | 1/2 |

TABLE 1-continued

Message type: LOCATION UPDATING REQUEST
Significance: dual
Direction: mobile station to network

| IEI | Information element | Type/Reference | Presence | Format | Length |
|---|---|---|---|---|---|
| | Location area identification | Location area identification 10.5.1.3 | M | V | 5 |
| | Mobile station classmark | Mobile station classmark 1 10.5.1.5 | M | V | 1 |
| | Mobile identity | Mobile identity 10.5.1.4 | M | LV | 2-9 |
| 33 | Mobile station classmark for UMTS | Mobile station classmark 2 10.5.1.6 | O | TLV | 5 |
| 34 | Last visited XA information | XA information and duration 10.5.3.X | O | TLV | 3-5 |

The location area identification stored in the SIM/USIM is used.

Mobile Station Classmark: This Information Element (IE) shall include for multiband MS the Classmark 1 corresponding to the frequency band in use.

Mobile Station Classmark for Iu mode (i.e. UMTS): This IE shall be included when the mobile station is in Iu mode network. The IE shall not be included when the mobile station is in A/Gb mode network.

Last Visited XA information: This IE shall be included when the mobile station supports the XA feature.

XA Information and Duration

| 8 | 7 | 6 | 5 | 4 | 3 | 2 | 1 | |
|---|---|---|---|---|---|---|---|---|
| XA Identifier IEI | | | | | | | | octet 1 |
| Length of XA Identifier contents | | | | | | | | octet 2 |
| Last visited XA ID | | | | | | | | octet 3 |
| XA visited before last visited XA | | | | | | | | octet 4 |
| Duration in last visited XA | | | | | Duration in XA before last XA | | | octet 5 |

If the Length=1, then only one XA ID is included.

The invention claimed is:

1. A method for registering a mobile terminal with a cellular telecommunications network, the method comprising:
   transmitting a signal including a temporary identifier, which is unique to a mobile terminal when combined with a location area identifier that identifies a cell for which the temporary identifier was allocated;
   transmitting an indication of whether the mobile terminal is configured to facilitate extended area-based location registration based on an extended area of coverage of the cellular telecommunication network that has a plurality of location areas and a plurality of extended areas of coverage where each extended area is represented by a list of a subset of cells on one or more of the location areas that are of a different bearer technology than other cells on the one or more of the location areas; and
   if the mobile terminal is configured to facilitate extended area-based location registration, performing location registration based on one of a plurality of extended areas of coverage of a cellular telecommunication network, and
   wherein the mobile terminal uses information about a given one of the location areas to connect to the network.

2. The method of claim 1, wherein extended area identification data is broadcast over the BCCH-ext channel.

3. The method of claim 1, wherein a last visited extended area is stored as a stored extended area and transmitted to the network during extended area-based location registration.

4. The method of claim 1, wherein a plurality of recently visited extended areas are stored during extended area-based location registration.

5. The method of claim 4, wherein an indication of an amount of time spent in each of one or more of the stored extended areas is stored and transmitted to the network.

6. A mobile terminal arranged to operate in accordance with the method in claim 1.

7. A cellular telecommunications network arranged to operate in accordance with the method in claim 1.

8. The method of claim 1, wherein the indication of whether the mobile terminal is configured to facilitate extended area-based location registration is encoded is within a location update request message.

9. The method of claim 8, wherein the signal including the temporary identifier is the location update request message, and wherein transmission of the temporary identifier within the location update request message allows for the indication of whether the mobile terminal is configured to facilitate extended area-based location registration to be encoded within the location update request message.

10. A method for registering a mobile terminal with a cellular telecommunications network, the cellular telecommunications network having a plurality of location areas and a plurality of extended areas of coverage, each extended area being represented by a list of a subset of cells on one or more of the location areas, the mobile terminal using information about a given one of the location areas to connect to the cellular telecommunications network, the method comprising:

storing an indication of an extended area among the plurality of extended areas that was most-recently visited by the mobile terminal;

transmitting a signal including a temporary identifier, which is unique to the mobile terminal when combined with a location area identifier that identifies a cell for which the temporary identifier was allocated;

transmitting an indication of whether the mobile terminal is configured to facilitate extended area-based location registration; and if the mobile terminal is configured to facilitate extended area-based location registration, performing location registration based on one of the plurality of extended areas of coverage of the cellular telecommunications network during which the indication of the extended area that was most-recently visited by the mobile terminal is transmitted to the cellular telecommunications network, and wherein each extended area is represented by the cells on the list of the subset of cells on the one or more of the location areas that represents each extended area are of a different bearer technology than other cells on the one or more of the location areas.

11. The method of claim 10, wherein extended area identification data is broadcast over the BCCH-ext channel.

12. The method of claim 10, wherein storing the indication of the extended area that was most-recently visited by the mobile terminal comprises storing an indication of each of multiple extended areas that were most-recently visited by the mobile terminal among the plurality of extended areas.

13. The method of claim 12, further comprising storing an indication of a respective amount of time spent by the mobile terminal in each of one or more of the multiple extended areas that were most-recently visited by the mobile terminal and transmitting the indication of the respective amount of time spent by the mobile terminal in each of the one or more of the multiple extended areas that were most-recently visited by the mobile terminal to the network.

14. A mobile terminal arranged to operate in accordance with the method in claim 10.

15. A cellular telecommunications network arranged to operate in accordance with the method in claim 10.

16. The method of claim 10, wherein the indication of whether the mobile terminal is configured to facilitate extended area-based location registration is encoded is within a location update request message.

17. The method of claim 16, wherein the signal including the temporary identifier is the location update request message, and wherein transmission of the temporary identifier within the location update request message allows for the indication of whether the mobile terminal is configured to facilitate extended area-based location registration and the indication of the extended area that was most-recently visited by the mobile terminal to be encoded within the location update request message.

18. A method for registering a mobile terminal with a cellular telecommunications network, the cellular telecommunications network having a plurality of location areas and a plurality of extended areas of coverage, each extended area being represented by a list of a subset of cells on one or more of the location areas, the mobile terminal using information about a given one of the location areas to connect to the cellular telecommunications network, the method comprising:

storing an indication of a respective amount of time spent by the mobile terminal in each of one or more extended areas among the plurality of extended areas that were most-recently visited by the mobile terminal;

transmitting a signal including a temporary identifier, which is unique to the mobile terminal when combined with a location area identifier that identifies a cell for which the temporary identifier was allocated;

transmitting an indication of whether the mobile terminal is configured to facilitate extended area-based location registration; and if the mobile terminal is configured to facilitate extended area-based location registration, performing location registration based on one of the plurality of extended areas of coverage of the cellular telecommunications network during which the indication of the respective amount of time spent by the mobile terminal in each of the one or more extended areas that were most-recently visited by the mobile terminal is transmitted to the cellular telecommunications network, and wherein each extended area is represented by the cells on the list of the subset of cells on the one or more of the location areas that represents each extended area are of a different bearer technology than other cells on the one or more of the location areas.

19. The method of claim 18, wherein extended area identification data is broadcast over the BCCH-ext channel.

20. The method of claim 18, wherein the indication of whether the mobile terminal is configured to facilitate extended area-based location registration is encoded is within a location update request message.

21. The method of claim 20, wherein the signal including the temporary identifier is the location update request message, and wherein transmission of the temporary identifier within the location update request message allows for the indication of whether the mobile terminal is configured to facilitate extended area-based location registration and the indication of the respective amount of time spent by the mobile terminal in each of the one or more extended areas that were most-recently visited by the mobile terminal to be encoded within the location update request message.

\* \* \* \* \*